United States Patent
Médioni (10) Patent No.: US 10,546,598 B2
(45) Date of Patent: *Jan. 28, 2020

(54) SYSTEMS AND METHODS FOR IDENTIFYING SPEECH BASED ON SPECTRAL FEATURES

(71) Applicant: GoPro, Inc., San Mateo, CA (US)

(72) Inventor: Tom Médioni, Paris (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/542,871

(22) Filed: Aug. 16, 2019

(65) Prior Publication Data

US 2019/0371358 A1 Dec. 5, 2019

Related U.S. Application Data

(63) Continuation of application No. 15/802,145, filed on Nov. 2, 2017, now Pat. No. 10,431,242.

(51) Int. Cl.
| | | |
|---|---|---|
| *G10L 15/00* | (2013.01) | |
| *G10L 25/78* | (2013.01) | |
| *G10L 25/21* | (2013.01) | |
| *G10L 25/18* | (2013.01) | |
| *G10L 15/04* | (2013.01) | |
| *G10L 15/22* | (2006.01) | |

(52) U.S. Cl.
CPC .............. *G10L 25/78* (2013.01); *G10L 15/04* (2013.01); *G10L 15/22* (2013.01); *G10L 25/18* (2013.01); *G10L 25/21* (2013.01)

(58) Field of Classification Search
CPC ...................................................... G10L 15/00

USPC .......... 704/9, 500, 270.1, 255, 254; 725/32; 386/285

See application file for complete search history.

(56) References Cited

U.S. PATENT DOCUMENTS

| | | | | |
|---|---|---|---|---|
| 5,615,296 A | * | 3/1997 | Stanford | G10L 15/22 704/270.1 |
| 5,742,733 A | * | 4/1998 | Jarvinen | G10L 19/06 704/219 |
| 5,742,927 A | * | 4/1998 | Crozier | G10L 21/0208 704/226 |
| 5,884,269 A | * | 3/1999 | Cellier | G10L 19/04 341/64 |

(Continued)

*Primary Examiner* — Michael C Colucci (74) *Attorney, Agent, or Firm* — Esplin & Associates, PC (57) ABSTRACT

Audio information defining audio content may be accessed. The audio content may have a duration. The audio content may be segmented into audio segments. Individual audio segments may correspond to a portion of the duration. The audio segments may include a first audio segment corresponding to a first portion of the duration. Energy features, entropy features, frequency features, and/or other features of the audio segments may be determined. Energy features may characterize energy of the audio segments. Entropy features may characterize spectral flatness of the audio segments. Frequency features may characterize highest frequencies of the audio segments. One or more of the audio segments may be identified as containing speech based on the energy features, the entropy features, the frequency features, and/or other information. Storage of the identification of the one or more of the audio segments as containing speech in one or more storage media may be effectuated.

20 Claims, 5 Drawing Sheets

(56) References Cited

U.S. PATENT DOCUMENTS

| | | | | |
|---|---|---|---|---|
| 6,115,684 A * | 9/2000 | Kawahara | G10L 21/04 704/203 |
| 6,647,365 B1 * | 11/2003 | Faller | G10L 19/0204 704/200.1 |
| 6,697,564 B1 * | 2/2004 | Toklu | H04N 21/4394 386/285 |
| 6,721,698 B1 * | 4/2004 | Hariharan | G10L 15/02 704/203 |
| 6,832,190 B1 * | 12/2004 | Junkawitsch | G10L 15/144 704/240 |
| 7,603,623 B1 * | 10/2009 | Lengeling | G10H 1/0008 715/725 |
| 8,380,331 B1 * | 2/2013 | Smaragdis | G10L 25/90 700/94 |
| 2005/0171768 A1 * | 8/2005 | Gierach | G10L 25/87 704/208 |
| 2006/0247919 A1 * | 11/2006 | Specht | G10L 21/06 704/201 |
| 2007/0078645 A1 * | 4/2007 | Niemisto | G10L 21/0208 704/200.1 |
| 2008/0147413 A1 * | 6/2008 | Sobol-Shikler | G10L 13/033 704/278 |
| 2009/0119102 A1 * | 5/2009 | Bangalore | G10L 15/1807 704/240 |
| 2009/0164226 A1 * | 6/2009 | Boehm | G10L 19/24 704/500 |
| 2010/0280827 A1 * | 11/2010 | Mukerjee | G10L 15/142 704/236 |
| 2011/0178795 A1 * | 7/2011 | Bayer | G10L 19/002 704/205 |
| 2012/0253813 A1 * | 10/2012 | Katagiri | G10L 25/78 704/254 |
| 2012/0303369 A1 * | 11/2012 | Brush | G10L 17/02 704/246 |
| 2013/0054236 A1 * | 2/2013 | Garcia Martinez | G10L 25/78 704/233 |
| 2013/0188796 A1 * | 7/2013 | Kristensen | H04R 25/453 381/60 |
| 2014/0067388 A1 * | 3/2014 | Manikandan | G10L 15/20 704/233 |
| 2015/0095038 A1 * | 4/2015 | Hu | G10L 19/18 704/500 |
| 2015/0106087 A1 * | 4/2015 | Newman | G10L 25/78 704/233 |
| 2015/0371665 A1 * | 12/2015 | Naik | G10L 25/87 704/248 |
| 2016/0014438 A1 * | 1/2016 | Xiong | H04N 21/8456 725/32 |
| 2016/0155441 A1 * | 6/2016 | Panda | G10L 25/51 704/233 |
| 2017/0330540 A1 * | 11/2017 | Quattro | G10H 1/0008 |

* cited by examiner

SYSTEMS AND METHODS FOR IDENTIFYING SPEECH BASED ON SPECTRAL FEATURES

FIELD

This disclosure relates to identifying speech using energy features, entropy features, and frequency features of audio segments.

BACKGROUND

Audio content may include capture of speech (spoken words). Computer identification of speech from other sounds in audio content may be difficult and/or inaccurate.

SUMMARY

Audio information defining audio content may be accessed. The audio content may have a duration. The audio content may be segmented into audio segments. Individual audio segments may correspond to a portion of the duration. The audio segments may include a first audio segment corresponding to a first portion of the duration. Energy features, entropy features, frequency features, and/or other features of the audio segments may be determined. Energy features may characterize energy of the audio segments. Energy features may include a first energy feature of the first audio segment. Entropy features may characterize spectral flatness of the audio segments. Entropy features may include a first entropy feature of the first audio segment. Frequency features may characterize highest frequencies of the audio segments. Frequency features may include a first frequency feature of the first audio segment. One or more of the audio segments may be identified as containing speech based on the energy features, the entropy features, the frequency features, and/or other information. The first audio segment may be identified as containing speech based on the first energy feature, the first entropy feature, the first frequency feature, and/or other information. Storage of the identification of the one or more of the audio segments as containing speech in one or more storage media may be effectuated.

A system that identifies speech within audio content may include one or more electronic storage, processor and/or other components. The electronic storage may store audio information defining audio content and/or other information. Audio content may refer to media content that may be consumed as one or more sounds. Audio content may include one or more sounds stored in one or more formats/containers, and/or other audio content. Audio content may have a duration. In some implementations, audio content may include audio portion of video content. Audio content may be captured during capture of the video content.

The processor(s) may be configured by machine-readable instructions. Executing the machine-readable instructions may cause the processor(s) to facilitate identifying speech within audio content. The machine-readable instructions may include one or more computer program components. The computer program components may include one or more of an audio information component, a segment component, an energy feature component, an entropy feature component, a frequency feature component, a speech component, a storage component, and/or other computer program components.

The audio information component may be configured to access audio information defining one or more audio content and/or other information. The audio information component may access audio information from one or more locations. The audio information component may access audio information during acquisition of the audio content and/or after acquisition of the audio content by one or more sound sensors.

The segment component may be configured to segment the audio content into audio segments. Individual audio segments may correspond to a portion of the duration of the audio content. The audio segments may include a first audio segment corresponding to a first portion of the duration and/or other audio segment(s) corresponding to other portion(s) of the duration. In some implementations, the audio content may be segmented into audio segments of a same segment duration. In some implementations, the same segment duration may be twenty-five milliseconds, fifty milliseconds, two-hundred milliseconds, one second, or other duration.

The energy feature component may be configured to determine energy features of the audio segments. The energy features may characterize energy of the audio segments and/or other information. The energy features may include a first energy feature of the first audio segment and/or other energy feature(s) of other audio segment(s).

The entropy feature component may be configured to determine entropy features of the audio segments. The entropy features may characterize spectral flatness of the audio segments and/or other information. The entropy features may include a first entropy feature of the first audio segment and/or other entropy feature(s) of other audio segment(s).

The frequency feature component may be configured to determine frequency features of the audio segments. The frequency features may characterize highest frequencies of the audio segments and/or other information. The frequency features may include a first frequency feature of the first audio segment and/or other frequency feature(s) of other audio segment(s).

The speech component may be configured to identify one or more of the audio segments as containing speech. One or more of the audio segments may be identified as containing speech based on the energy features, the entropy features, the frequency features, and/or other information. For example, the first audio segment may be identified as containing speech based on the first energy feature, the first entropy feature, the first frequency feature, and/or other information.

In some implementations, the speech component may be configured to identify the one or more of the audio segments as containing speech by (1) comparing a given energy feature (e.g., first energy feature) of a given audio segment (e.g., first audio segment) to an energy threshold, and (2) changing a speech counter corresponding to the given audio segment based on the given energy feature meeting the energy threshold and/or other information.

In some implementations, the speech component may be configured to identify the one or more of the audio segments as containing speech by (1) comparing a given entropy feature (e.g., first entropy feature) of a given audio segment (e.g., first audio segment) to an entropy threshold, and (2) changing the speech counter corresponding to the given audio segment based on the given entropy feature meeting the entropy threshold and/or other information.

In some implementations, the speech component may be configured to identify the one or more of the audio segments as containing speech by (1) comparing a given frequency feature (e.g., first frequency feature) of a given audio segment (e.g., first audio segment) to a frequency threshold, and (2) changing the speech counter corresponding to the given audio segment based on the given frequency feature meeting the frequency threshold and/or other information.

In some implementations, the speech counter corresponding to the given audio segment (e.g., first audio segment) may be initially set to zero. The speech counter corresponding to the given audio segment may be incremented by one for an individual feature of the given audio segment meeting an individual threshold. The given audio segment may be identified as containing speech based on the speech counter corresponding to the given audio segment being more than one.

In some implementations, the speech component may be configured to generate a binary curve indicating the one or more of the audio segments as containing speech. In some implementations, the binary curve may be smoothed based on a number of silent audio segments.

The storage component may be configured to effectuate storage the identification of the one or more of the audio segments as containing speech and/or other information in one or more storage media. The storage component may effectuate storage of the identification of the one or more of the audio segments as containing speech and/or other information in one or more storage locations including the audio information and/or other storage locations.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
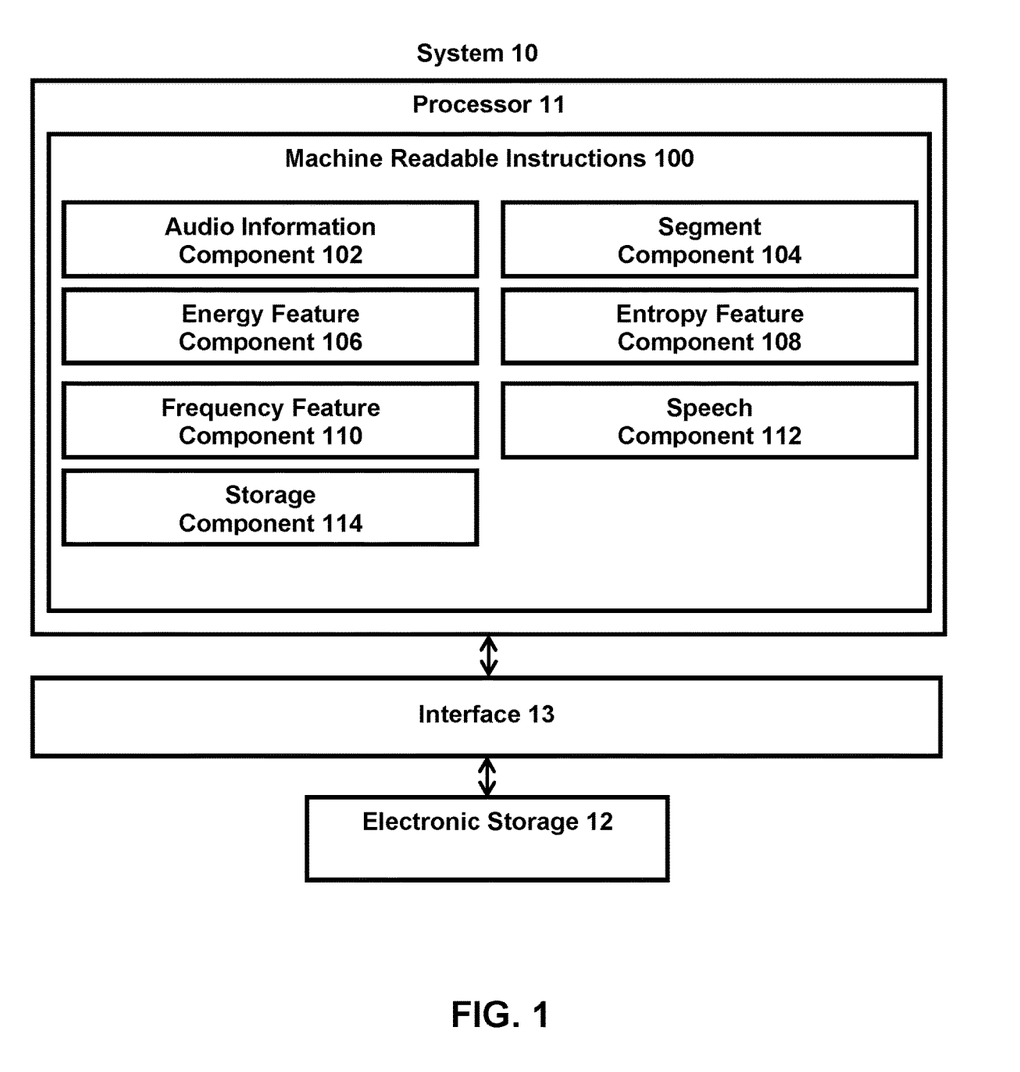
FIG. 1 illustrates a system that identifies speech within audio content.

FIG. 1 illustrates a system 10 for identifying speech within audio content. The system 10 may include one or more of a processor 11, an electronic storage 12, an interface 13 (e.g., bus, wireless interface), and/or other components. Audio information defining audio content may be accessed by the processor 11. The audio content may have a duration. The audio content may be segmented into audio segments. Individual audio segments may correspond to a portion of the duration. The audio segments may include a first audio segment corresponding to a first portion of the duration. Energy features, entropy features, frequency features, and/or other features of the audio segments may be determined by the processor 11. Energy features may characterize energy of the audio segments. Energy features may include a first energy feature of the first audio segment. Entropy features may characterize spectral flatness of the audio segments. Entropy features may include a first entropy feature of the first audio segment. Frequency features may characterize highest frequencies of the audio segments. Frequency features may include a first frequency feature of the first audio segment. One or more of the audio segments may be identified as containing speech based on the energy features, the entropy features, the frequency features, and/or other information. The first audio segment may be identified as containing speech based on the first energy feature, the first entropy feature, the first frequency feature, and/or other information. The identification of the one or more of the audio segments as containing speech may be stored in one or more storage media.

The electronic storage 12 may be configured to include electronic storage medium that electronically stores information. The electronic storage 12 may store software algorithms, information determined by the processor 11, information received remotely, and/or other information that enables the system 10 to function properly. For example, the electronic storage 12 may store information relating to audio information, audio content, audio segments, energy features, entropy features, frequency features, speech, identification of audio segments as containing speech, speech counter, and/or other information.

For example, the electronic storage 12 may store audio information defining one or more audio content and/or other information. Audio content may refer to media content that may be consumed as one or more sounds, such as words, songs, vocal sounds, non-vocal sounds, and/or other sounds. Audio content may include recorded sounds (e.g., captured via one or more sound sensors), computer-generated sounds, processed sounds, and/or other sounds. Audio content may include one or more sounds stored in one or more formats/containers, and/or other audio content. A format may refer to one or more ways in which the information defining audio content is arranged/laid out (e.g., file format). A container may refer to one or more ways in which information defining audio content is arranged/laid out in association with other information (e.g., wrapper format).

Audio content may have a duration. A duration may be defined in terms of time durations and/or other metrics. For example, audio content may include captured audio having a time duration of 60 seconds. Other times durations are contemplated.

In some implementations, audio content may be associated with video content. For example, the audio content may be captured during/with capture of the video content. That is, audio content may be captured during/with capture of one or more videos by an image capture device (including optical element(s), image sensor(s), processor(s)). The audio content may be captured by one or more sound sensors of the image capture device (e.g., microphone of and/or coupled to the image capture device) and/or captured by one or more sound sensors separate from the image capture device (e.g., microphone separate from the image capture device). The audio content may be stored with the video content (e.g., audio content may include audio portion of the video content) and/or separately from the video content (e.g., audio file is separate from video file).

The sound(s) within the audio content may correspond the sound(s) that were captured when capturing the video content. For example, the video content may include a visual capture of an activity involving one or more persons and the audio content may include sound capture of the activity, which may include sounds produced by persons or non-persons (e.g., animals, machines, objects). One or more portions of the audio content may include capture of speech by one or more persons and/or other sounds. Speech may refer to vocal sounds made by a person. Speech may be directed to one or more persons or one or more non-persons. Speech may include part of a spoken word, one or more spoken words, and/or other vocal sounds.

Referring to FIG. 1, the processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine readable instructions 100 to facilitate identifying speech within audio content. The machine readable instructions 100 may include one or more computer program components. The machine readable instructions 100 may include one or more of an audio information component 102, a segment component 104, an energy feature component 106, an entropy feature component 108, a frequency feature component 110, a speech component 112, a storage component 114, and/or other computer program components.

The audio information component 102 may be configured to access audio information defining one or more audio content and/or other information. Accessing audio information may include one or more of acquiring, analyzing, determining, examining, loading, locating, obtaining, opening, receiving, retrieving, reviewing, storing, and/or otherwise accessing the audio information. The audio information component 102 may obtain audio information from one or more locations. For example, the audio information component 102 may access audio information from a storage location, such as the electronic storage 12, electronic storage of information and/or signals generated by one or more sound sensors (not shown in FIG. 1), electronic storage of a device accessible via a network, and/or other locations. The audio information component 102 may obtain audio information from one or more hardware components (e.g., a sound sensor) and/or one or more software components (e.g., software running on a computing device).

The audio information component 102 may be configured to access audio information during acquisition of the audio content and/or after acquisition of the audio content by one or more sound sensors. For example, the audio information component 102 may access audio information while the sounds are being captured by one or more sound sensors. The audio information component 102 may access audio information defining sounds after the sounds have been captured and stored in memory (e.g., the electronic storage 12). For example, the processor 11 may be included within an image capture device that capture video content and the audio information component 102 may access audio information defining audio content for the video content during/after acquisition of the video content. As another example, the processor 11 may be included within a mobile/desktop device and the audio information component 102 may access audio information defining audio content for video content based on access of the video content by the mobile/desktop device.

In some implementations, the audio information may be accessed based on user interaction with a user interface/application (e.g., video editing application, audio editing application), and/or other information. For example, a user interface/application may provide option(s) for a user to select one or more audio content from which speech is to be detected. The audio information defining the audio content may be obtained based on the user's selection of the audio content and/or the video content including/associated with the audio content through the user interface/application. For example, the audio information may be accessed based on user selection (via user interface/application) of an audio file or a video file including/associated with an audio file/portion.

The segment component 104 may be configured to segment the audio content into audio segments (windows). Individual audio segments may correspond to a portion of the duration of the audio content. For example, the audio segments may include a given audio segment corresponding to a given portion of the duration and/or other audio segment(s) corresponding to other portion(s) of the duration. In some implementations, the audio content may be segmented into audio segments of a same segment duration or different segment durations. In some implementations, the same segment duration may be twenty-five milliseconds, fifty milliseconds, two-hundred milliseconds, one second, or other duration.

Figure 3:
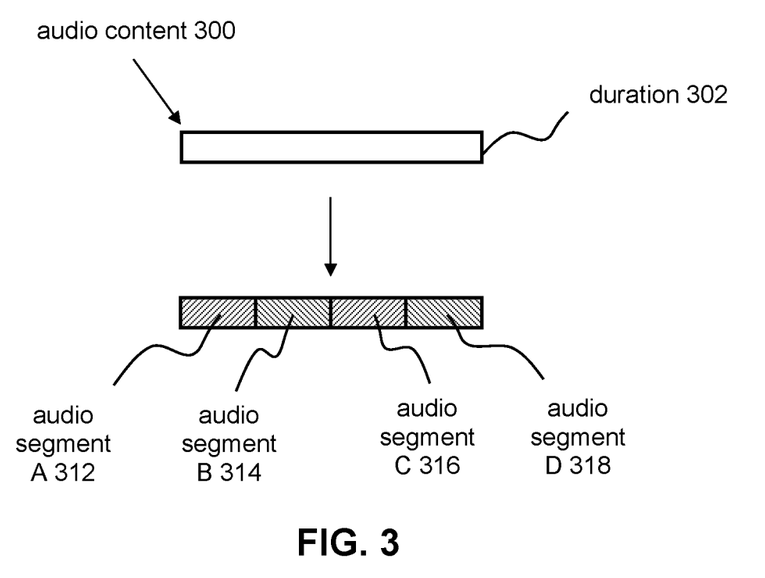
FIG. 3 illustrates an example segmentation of audio content.

For example, FIG. 3 illustrates example segmentation of audio content 300. The audio content 300 may have a duration 302. The segment component 104 may segment the audio content 300 into audio segment A 312, audio segment B 314, audio segment C 316, audio segment D 318, and/or other audio segments. The audio segment A 312, the audio segment B 314, the audio segment 316, and the audio segment D 318 may be of a same segment duration (e.g., fifty milliseconds) or different segment durations. In some implementations, audio segments segmented by the segmentation component 104 may include overlap between adjacent audio segments. In some implementations, audio segments segmented by the segmentation component 104 may not include overlap between adjacent audio segments. Other segmentations of audio content are contemplated.

The energy feature component 106 may be configured to determine energy features of the audio segments. The energy features may characterize energy of the audio segments and/or other information. For example, the energy features may include a given energy feature of a given audio segment and/or other energy feature(s) of other audio segment(s). In some embodiments, the energy features of the audio segments may be determined based a sum of the square of energy values of the audio segments. In some embodiments, the energy features of the audio segments may be determined from spectrums of the audio segments. In some implementations, the energy feature component 106 may determine the energy features of the audio segments after application of one or more filters to the audio segments (e.g., to remove one or more effects of particular noise on the energy of the audio segments). Other determinations of energy features of the audio segments are contemplated.

Figure 4:
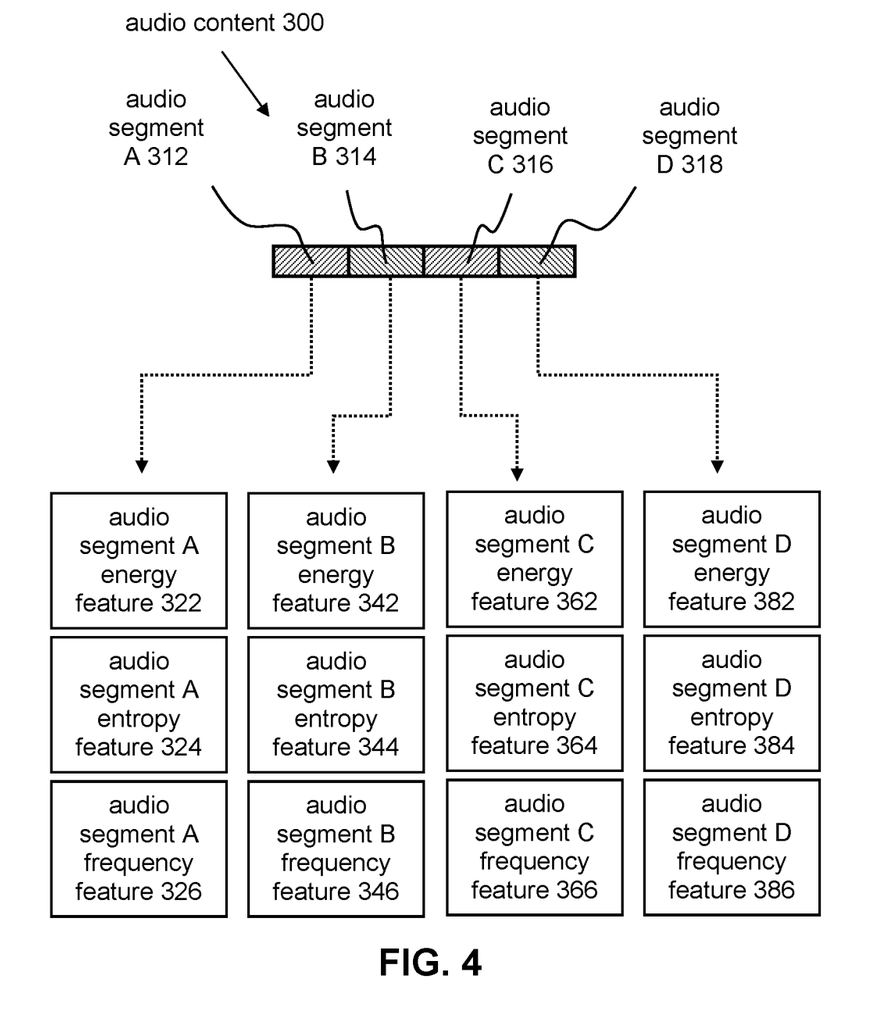
FIG. 4 illustrates example feature extractions from audio segments of audio content.

FIG. 4 illustrates example feature extractions from the audio segments 312, 314, 316, 318 of the audio content 300. As shown in FIG. 4, the energy feature component 106 may determine audio segment A energy feature 322 of the audio segment A 312, audio segment B energy feature 342 of the audio segment B 314, audio segment C energy feature 362 of the audio segment C 316, and audio segment D energy feature 382 of the audio segment D 318.

The entropy feature component 108 may be configured to determine entropy features of the audio segments. The entropy features may characterize spectral flatness of the audio segments and/or other information. For example, the entropy features may include a given entropy feature of a given audio segment and/or other entropy feature(s) of other audio segment(s). In some embodiments, the entropy features of the audio segments may be determined based on the number/amount of distinct peaks in the spectrums (e.g., computed using Fourier transform) of the audio segments. Such peaks may represent sound of given tonality. Speech/voice of persons may be characterized by one or more distinct frequencies and the entropy features may be determined based on the distinct frequencies. In some implementations, the entropy feature component 108 may determine the entropy features of the audio segments after application of one or more filters to the audio segments (e.g., to remove one or more effects of particular noise on the entropy of the audio segments). Other determinations of entropy features of the audio segments are contemplated.

For example, referring to FIG. 4, the entropy feature component 108 may determine audio segment A entropy feature 324 of the audio segment A 312, audio segment B entropy feature 344 of the audio segment B 314, audio segment C entropy feature 364 of the audio segment C 316, and audio segment D entropy feature 384 of the audio segment D 318.

The frequency feature component 110 may be configured to determine frequency features of the audio segments. The frequency features may characterize highest frequencies of the audio segments and/or other information. For example, the frequency features may include a given frequency feature of a given audio segment and/or other frequency feature(s) of other audio segment(s). In some implementations, the frequency features of the audio segments may be determined based on extraction of frequency components of the audio segments. Determinations of the highest frequencies of the audio segments may enable matching between the highest frequencies and the frequencies of human speech. In some implementations, the frequency feature component 110 may determine the frequency features of the audio segments after application of one or more filters to the audio segments (e.g., to remove one or more effects of particular noise on the frequency of the audio segments). Other determinations of frequency features of the audio segments are contemplated.

For example, referring to FIG. 4, the frequency feature component 110 may determine audio segment A frequency feature 326 of the audio segment A 312, audio segment B frequency feature 346 of the audio segment B 314, audio segment C frequency feature 366 of the audio segment C 316, and audio segment D frequency feature 386 of the audio segment D 318.

The speech component 112 may be configured to identify one or more of the audio segments as containing speech. The speech component 112 may identify one or more of the audio segments as containing speech based on the energy features, the entropy features, the frequency features, and/or other information. For example, the speech component 112 may identify the given audio segment as containing speech based on the given energy feature, the given entropy feature, the given frequency feature, and/or other information.

The speech component 112 may identify one or more of the audio segments as containing speech via use of one or more speech counters corresponding to the audio segment(s). A speech counter may keep track of the number of features of a corresponding audio segment that meets a given criteria (e.g., threshold value). For example, the speech component 112 may use a speech counter corresponding to the audio segment A 312 to determine whether the audio segment A 312 contains speech. In some embodiments, the speech component 112 may identify one or more of the audio segments as containing speech via use of a silence counter. The silence counter may keep track of the number of consecutive audio segments that are silent/labeled as silent (e.g., sound captured within the audio segment is below a certain zero or non-zero energy threshold).

The speech component 112 may be configured to identify the one or more of the audio segments as containing speech by (1) comparing a given energy feature (e.g., audio segment A energy feature 322) of a given audio segment (e.g., audio segment A 312) to an energy threshold, and (2) changing the speech counter corresponding to the given audio segment based on the given energy feature meeting the energy threshold and/or other information. The energy threshold may include a static component and/or a dynamic components. For example, a given energy feature of a given audio segment may be compared to a dynamic energy threshold that changes based on the number of consecutive preceding audio segments that are silent/labeled as silent (e.g., as indicated by the silence counter).

For example, based on a given number (e.g., 5) of previous audio segments containing speech, the given energy feature of a given audio segment may be compared to a static energy threshold and/or other values. The static energy threshold may be a value (e.g., 15) set based on system default, user input, video content (based on activity captured within the video), and/or other information. Based on a given number (e.g., 25) of consecutive preceding audio segments being silent/labeled as silent, the given energy feature of a given audio segment may be compared to a dynamic energy threshold and/or other values. The dynamic energy threshold may be a value set based on a base threshold value and energies within the audio content. For example, dynamic energy threshold ($E_{threshold}$) may be calculated as:

$$E_{threshold} = E_{base\ threshold} \times \log_{10}\left(\frac{s \times E_{min} + E_i}{s+1}\right), \quad (46)$$

with $$E_i = \sum_{n=0}^{+\infty} w_i(n)x(n)^2,$$

($w_i(n)=0$ if $n \in [0, W \times n] \cup [W \times (n+1), +\infty]$, $w_i(n)=1$ otherwise, where W is the signal window constant size)

The term s may represent the number of consecutive preceding audio segments that are silent/labeled as silent, and the term $E_i$ may denote the actual level of short-term energy. The term $w_i$ may represent the $i^{th}$ window support function and x may represent the signal in the audio content/audio segment. Other calculations of dynamic energy threshold are contemplated.

The speech component 112 may be configured to identify the one or more of the audio segments as containing speech by (1) comparing a given entropy feature (e.g., audio segment A entropy feature 324) of a given audio segment (e.g., audio segment A 312) to an entropy threshold, and (2) changing the speech counter corresponding to the given audio segment based on the given entropy feature meeting the entropy threshold and/or other information. The entropy threshold may include a static component and/or a dynamic components. For example, a given entropy feature of a given audio segment may be compared to a static entropy threshold and/or other values. The static entropy threshold may be a value (e.g., 7) set based on system default, user input, video content (based on activity captured within the video), and/or other information. For example, an entropy feature having a value less than 7 may indicate capture of sound having a tonal quality of speech while higher values may indicate capture of noise.

The speech component 112 may be configured to identify the one or more of the audio segments as containing speech by (1) comparing a given frequency feature (e.g., audio segment A entropy feature 326) of a given audio segment (e.g., audio segment A 312) to a frequency threshold, and (2) changing the speech counter corresponding to the given audio segment based on the given frequency feature meeting the frequency threshold and/or other information. The frequency threshold may include a static component and/or a dynamic components. For example, a given frequency feature of a given audio segment may be compared to a static frequency threshold and/or other values. The static frequency threshold may be a value or a range of values (e.g., 80-900 Hz) set based on system default, user input, video content (based on activity captured within the video), and/or other information. For example, the frequency value of speech of a person may generally depend on the age, sex, and/or other characteristics of the person.

In some implementations, the speech counter corresponding to the given audio segment (e.g., audio segment A 312) may be initially set to zero. The speech counter corresponding to the given audio segment may be incremented by one for an individual feature of the given audio segment meeting an individual threshold. For example, the speech component 112 may increment a given speech counter based on the corresponding energy feature, entropy feature, or frequency feature meeting the corresponding threshold. The speech component 112 may identify the given audio segment as containing speech based on the speech counter corresponding to the given audio segment being more than one (e.g., the features of the given audio segment satisfies two or more thresholds). Other initial values of the speech counter, other changes in the values of the speech counter, and other speech counter values for determining speech are contemplated.

Figure 5:
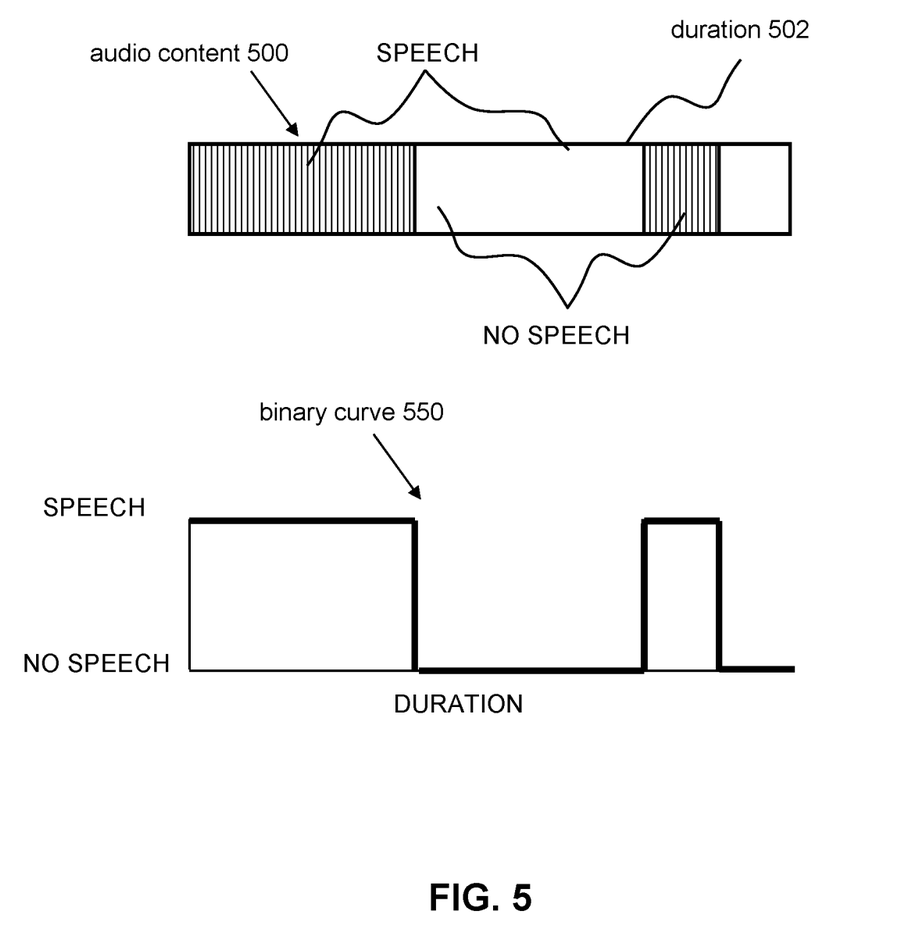
FIG. 5 illustrates an example binary curve indicating one or more audio segments as containing speech.

In some implementations, the speech component 112 may be configured to generate a binary curve indicating the one or more of the audio segments as containing speech. For example, FIG. 5 illustrates an example audio content 500 having a duration 502, with different portions marked as containing speech and no speech. The speech component 112 may generate a binary curve 550. The binary curve 550 may indicate portions (audio segments, durations) of the audio content 500 that contains speech (e.g., value of 1) and portions of the audio content 500 that do not contain speech (e.g., value of 0). Other values for the binary curve are contemplated.

In some implementations, the identification of audio segments as containing speech and/or the binary curve may be smoothed based on a number of silent/speech audio segments. For example, simply labeling the binary curve based on the values in the corresponding speech counters may result in undesirable breaks in speech labeling. For example, the audio content may include capture of a person speaking with a short pause. It may be desirable to mark such short pause in speech as containing speech to provide for a continuity of labeling for the entire speech. The speech component 112 may smooth the identification of audio segments as containing speech and/or the binary curve so that once speech is identified in the audio content, a certain consecutive number (e.g., 25) of audio segments following the speech must have speech counters that indicates no speech (e.g., silence) to change the marking of the audio segments as containing speech to not containing speech (e.g., need 25 continuous silent audio segments to identify a change from speech to no speech). For example, based on identification of speech at a certain duration within the audio content, a break in speech following that duration may be required to be for a certain length of time (e.g., 1.25 seconds) to change the identification from speech to no speech.

As another example, the audio content may include a short audio segment that is marked as containing speech, surrounded by audio segments containing no speech. Such a short segment may correspond to a false positive (false speech detection) or a capture of an unintended speech. It may be desirable to mark such short audio segment as not containing speech. The speech component 112 may smooth the identification of audio segments as containing speech and/or the binary curve so that once lack of speech is identified in the audio content, a certain consecutive number (e.g., 5) of audio segments following the lack of speech must have speech counters that indicates speech to change the marking of the audio segments as not containing speech to containing speech (e.g., need 5 continuous speech audio segments to identify a change from no speech to speech). For example, based on identification of lack of speech at a certain duration within the audio content, a speech following that duration may be required to be for a certain length of time (e.g., 0.25 second) to change the identification from no speech to speech.

The identification of the one or more of the audio segments as containing speech may be used to identify one or more moments within the audio content and/or one or more moments within the associated video content (e.g., identifying time portions of a video based on speech contained within audio of the video). For example, the identification of audio segments containing speech may be used to trim the audio content and/or the associated video content to remove undesirable portions (e.g., too noisy) and/or to keep desirable portions (e.g., moments of interest). The identification of audio segments containing speech may be used to emphasize certain portions of the video content. For example, visual effects (e.g., color changes, pixel manipulation, transitions) may be added to the video content based on the identification of audio segments containing speech (e.g., add transitions between/during speech). The video content may be played back with musical track (e.g., video content may be synchronized for playback with musical track) and the identification of audio segments (audio portions of the video content) containing speech may be used to include the speech during playback so that the speech is heard above/in place of the musical track (audio portion of the video content plays on top of or replaces the musical track for a duration; volume of the audio portion of the video content is increased).

The storage component 114 may be configured to effectuate storage of the identification of the one or more of the audio segments as containing speech and/or other information in one or more storage media. The identification of the one or more of the audio segments as containing speech may be stored with the audio content, separately from the audio content, with the associated video content, separately from the associated video content, and/or in other forms. In some implementations, the identification of the one or more of the audio segments as containing speech may be stored within a file (e.g., director track) that describes how the audio content and/or the associated video content may be presented during playback.

In some implementations, the storage component 114 may effectuate storage of the identification of the one or more of the audio segments as containing speech in one or more storage locations including the audio information and/or other storage locations. For example, the audio information may have been accessed from the electronic storage 12 and the identification of the one or more of the audio segments as containing speech may be stored in the electronic storage 12. In some implementations, the storage component 114 may effectuate storage of the identification of the one or more of the audio segments as containing speech in one or more remote storage locations (e.g., storage media located at/accessible through a server). In some implementations, the storage component 114 may effectuate storage of the identification of the one or more of the audio segments as containing speech through one or more intermediary devices. Other storage locations for and storage of the identification of the one or more of the audio segments as containing speech are contemplated.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 12, and the display 14 are shown to be connected to the interface 13 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 12 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 12 may be a separate component within the system 10, or the electronic storage 12 may be provided integrally with one or more other components of the system 10 (e.g., the processor 11). Although the electronic storage 12 is shown in FIG. 1 as a single entity, this is for illustrative purposes only. In some implementations, the electronic storage 12 may comprise a plurality of storage units. These storage units may be physically located within the same device, or the electronic storage 12 may represent storage functionality of a plurality of devices operating in coordination.

Figure 2:
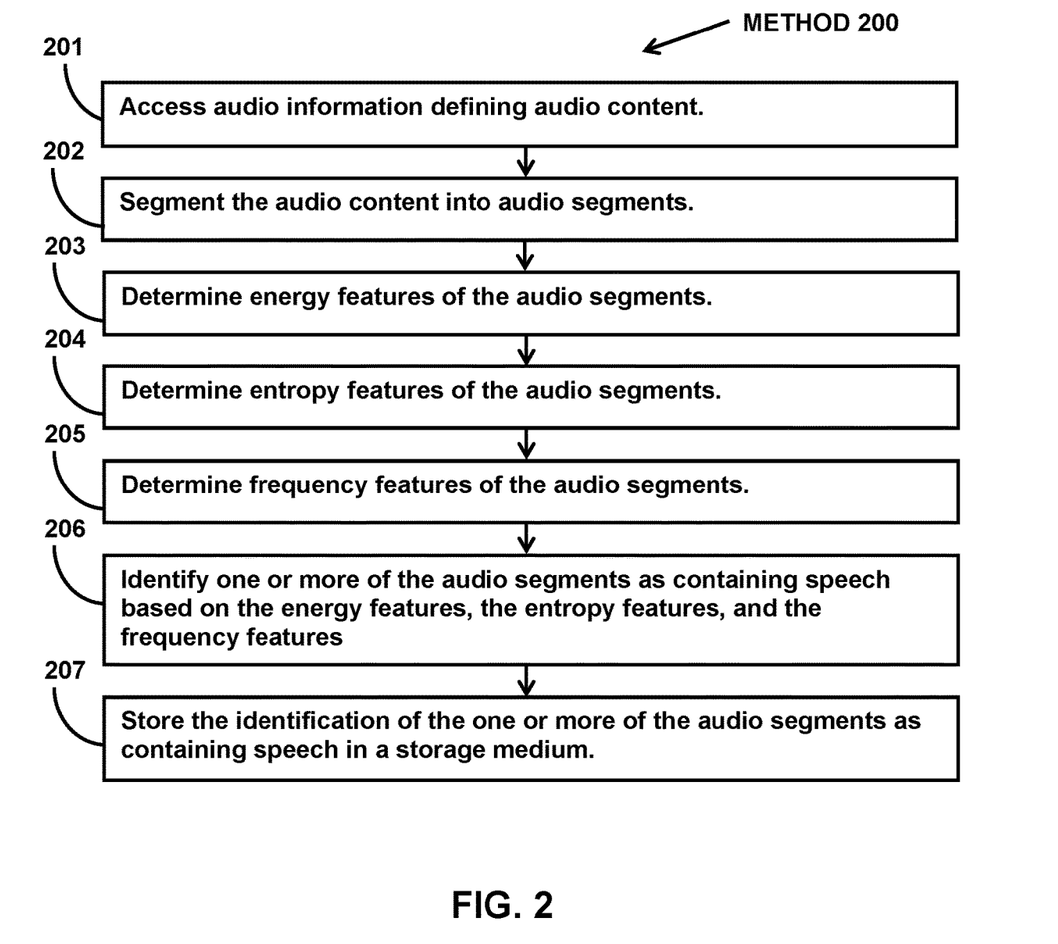
FIG. 2 illustrates a method for identifying speech within audio content.

FIG. 2 illustrates method 200 for identifying speech within audio content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, audio information defining audio content may be accessed. The audio content may have a duration. In some implementation, operation 201 may be performed by a processor component the same as or similar to the audio information component 102 (Shown in FIG. 1 and described herein).

At operation 202, the audio content may be segmented into audio segments. Individual audio segments may correspond to a portion of the duration. In some implementations, operation 202 may be performed by a processor component the same as or similar to the segment component 104 (Shown in FIG. 1 and described herein).

At operation 203, energy features of the audio segments may be determined. The energy features may characterize energy of the audio segments. In some implementations, operation 203 may be performed by a processor component the same as or similar to the energy feature component 106 (Shown in FIG. 1 and described herein).

At operation 204, entropy features of the audio segments may be determined. The entropy features may characterize spectral flatness of the audio segments. In some implementations, operation 204 may be performed by a processor component the same as or similar to the entropy feature component 108 (Shown in FIG. 1 and described herein).

At operation 205, frequency features of the audio segments may be determined. The frequency features may characterize highest frequencies of the audio segments. In some implementations, operation 205 may be performed by a processor component the same as or similar to the frequency feature component 110 (Shown in FIG. 1 and described herein).

At operation 206, one or more of the audio segments may be identified as containing speech based on the energy features, the entropy features, and the frequency features. In some implementations, operation 206 may be performed by a processor component the same as or similar to the speech component 112 (Shown in FIG. 1 and described herein).

At operation 207, the identification of the one or more of the audio segments as containing speech may be stored in a storage medium. In some implementations, operation 207 may be performed by a processor component the same as or similar to the storage component 114 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system that identifies speech, the system comprising:
one or more physical processors configured by machine-readable instructions to:
access audio information defining audio content, the audio content having a duration and including audio segments, individual audio segments corresponding to a portion of the duration, the audio segments including a first audio segment corresponding to a first portion of the duration;
determine energy features, entropy features, and frequency features of the audio segments, the energy features including a first energy feature of the first audio segment, the entropy features including a first entropy feature of the first audio segment, and the frequency features including a first frequency feature of the first audio segment;
identify one or more of the audio segments as containing speech based on the energy features, the entropy features, and the frequency features, wherein the first audio segment is identified as containing speech based on the first energy feature, the first entropy feature, and the first frequency feature; and
generate a binary curve indicating the one or more of the audio segments as containing speech, wherein the binary curve is smoothed based on a number of silent audio segments.

2. The system of claim 1, wherein the audio segments include overlap between adjacent audio segments.

3. The system of claim 1, wherein the audio segments do not include overlap between adjacent audio segments.

4. The system of claim 1, wherein the energy features, the entropy features, and the frequency features of the audio segments are determined after application of one or more filters to the audio segments.

5. The system of claim 1, wherein the one or more of the audio segments are identified as containing speech via use of one or more speech counters corresponding to the one or more audio segments, wherein an individual speech counter keeps track of a number of features of a corresponding audio segment that meet a corresponding threshold.

6. The system of claim 5, wherein the one or more physical processors are, to identify the one or more of the audio segments as containing speech, further configured by the machine-readable instructions to:
compare the first energy feature to an energy threshold;
change a first speech counter corresponding to the first audio segment based on the first energy feature meeting the energy threshold;
compare the first entropy feature to an entropy threshold;
change the first speech counter corresponding to the first audio segment based on the first entropy feature meeting the entropy threshold;
compare the first frequency feature to a frequency threshold; and
change the first speech counter corresponding to the first audio segment based on the first frequency feature meeting the frequency threshold.

7. The system of claim 6, wherein:
the first speech counter corresponding to the first audio segment is initially set to zero;

the first speech counter corresponding to the first audio segment is incremented by one for an individual feature of the first audio segment meeting an individual threshold; and the first audio segment is identified as containing speech based on the first speech counter corresponding to the first audio segment being more than one.

8. The system of claim 1, wherein smoothing of the binary curve based on the number of silent audio segments includes requiring a certain consecutive number of the silent audio segments following identification, by the binary curve, of speech to change the identification from speech to no speech.

9. The system of claim 8, wherein smoothing of the binary curve based on the number of silent audio segments further includes requiring a certain consecutive number of speech audio segments following the identification, by the binary curve, of no speech to change the identification from no speech to speech.

10. The system of claim 1, wherein identification of speech within the audio content is used to identify or emphasize one or more moments within video content associated with the audio content.

11. A method for identifying speech, the method performed by a computing system including one or more physical processors, the method comprising:

accessing, by the computing system, audio information defining audio content, the audio content having a duration and including audio segments, individual audio segments corresponding to a portion of the duration, the audio segments including a first audio segment corresponding to a first portion of the duration;

determining, by the computing system, energy features, entropy features, and frequency features of the audio segments, the energy features including a first energy feature of the first audio segment, the entropy features including a first entropy feature of the first audio segment, and the frequency features including a first frequency feature of the first audio segment;

identifying, by the computing system, one or more of the audio segments as containing speech based on the energy features, the entropy features, and the frequency features, wherein the first audio segment is identified as containing speech based on the first energy feature, the first entropy feature, and the first frequency feature; and generating, by the computing system, a binary curve indicating the one or more of the audio segments as containing speech, wherein the binary curve is smoothed based on a number of silent audio segments.

12. The method of claim 11, wherein the audio segments include overlap between adjacent audio segments.

13. The method of claim 11, wherein the audio segments do not include overlap between adjacent audio segments.

14. The method of claim 11, wherein the energy features, the entropy features, and the frequency features of the audio segments are determined after application of one or more filters to the audio segments.

15. The method of claim 11, wherein the one or more of the audio segments are identified as containing speech via use of one or more speech counters corresponding to the one or more audio segments, wherein an individual speech counter keeps track of a number of features of a corresponding audio segment that meet a corresponding threshold.

16. The method of claim 15, wherein identifying the one or more of the audio segments as containing speech includes:

comparing the first energy feature to an energy threshold;

changing a first speech counter corresponding to the first audio segment based on the first energy feature meeting the energy threshold;

comparing the first entropy feature to an entropy threshold;

changing the first speech counter corresponding to the first audio segment based on the first entropy feature meeting the entropy threshold;

comparing the first frequency feature to a frequency threshold; and changing the first speech counter corresponding to the first audio segment based on the first frequency feature meeting the frequency threshold.

17. The method of claim 16, wherein:

The first speech counter corresponding to the first audio segment is initially set to zero;

the first speech counter corresponding to the first audio segment is incremented by one for an individual feature of the first audio segment meeting an individual threshold; and the first audio segment is identified as containing speech based on the first speech counter corresponding to the first audio segment being more than one.

18. The method of claim 11, wherein smoothing of the binary curve based on the number of silent audio segments includes requiring a certain consecutive number of the silent audio segments following identification, by the binary curve, of speech to change the identification from speech to no speech.

19. The method of claim 18, wherein smoothing of the binary curve based on the number of silent audio segments further includes requiring a certain consecutive number of speech audio segments following the identification, by the binary curve, of no speech to change the identification from no speech to speech.

20. The method of claim 11, wherein identification of speech within the audio content is used to identify or emphasize one or more moments within video content associated with the audio content.

* * * * *